United States Patent Office 3,544,488
Patented Dec. 1, 1970

3,544,488
CROSS-LINKED ACRYLONITRILE COPOLYMERS AND ION EXCHANGERS MADE THEREFROM
Herbert Corte, Opladen, and Harold Heller, Leichlingen, Germany, assignors to Farbenfabriken Bayer Aktiengesellschaft, Leverkusen, Germany, a corporation of Germany
No Drawing. Filed July 24, 1967, Ser. No. 655,312
Claims priority, application Germany, Sept. 22, 1966, F 50,260; Dec. 5, 1966, F 50,853
The portion of the term of the patent subsequent to Feb. 11, 1986, has been disclaimed
Int. Cl. C08f 15/40, 15/02
U.S. Cl. 260—2.2                                    6 Claims

ABSTRACT OF THE DISCLOSURE

Hydrolysis resistant copolymers of acrylonitrile and a hydrocarbon containing two or more allyl groups. Copolymers may contain further monomers. Process for producing these copolymers. Process for hydrolysing the CN-groups of these copolymers to yield weakly acidic ion exchangers and ion exchangers constituting these hydrolysis products.

---

It is already known that cross-linked polymers of acrylonitrile can be produced by copolymerising acrylonitrile with methacrylic anhydride, vinyl or allyl acrylate or methacrylate, acrylates or methacrylates of polyhydric alcohols, allyl esters of dibasic acids, N,N'-methylene-bis-acrylamide, triacryloyl perhydro-s-triazine, vinyl, allyl or homologous ethers, di- or trivinyl benzene, divinyl toluene, divinyl xylene, polyvinyl anthracene or divinyl pyridine as cross-linking agents.

Of these cross-linking agents, methacrylic anhydride, vinyl and allyl acrylate or methacrylate, acrylates or methacrylates of polyhydric alcohols, allyl esters of dibasic acids, N,N'-methylene-bis - acrylamide, triacryloyl-perhydro-s-triazine and vinyl, allyl and homologous ethers, are not resistant to hydrolysis, so that the resulting copolymers with acrylonitrile enter completely into solution when they are hydrolysed with strong acids or alkalis.

Copolymers obtained with e.g. divinyl benzene as the cross-linking agent are always non-uniformly cross-linked and contain relatively large quantities of uncross-linked and hence soluble polyacrylonitrile. This is also, the case when the copolymers are prepared from acrylonitrile and divinyl benzene in the presence of a third polymerisable compound. If the copolymers are obtained, in accordance with other known process, by copolymerisation in the presence of organic solvents, the solubility of the polymers is considerably increased.

A process for the production of cross-linked copolymers of acrylonitrile has now been found in which acrylonitrile and, optionally, a further monomer copolymerisable with it are polymerised with the aid of a catalyst in the presence of aliphatic or cycloaliphatic hydrocarbons containing two or more allyl groups and optionally in the presence of another cross-linking agent.

For the purposes of this invention, allyl groups are groups which correspond to the formula

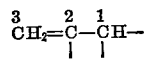

in which the carbon atom numbered 1 forms part of an aliphatic hydrocarbon radical or of a cycloaliphatic ring and is linked to at least one hydrogen atom. More especially an allyl group containing aliphatic or cycloaliphatic hydrocarbon is a compound of the formula I
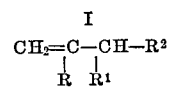

wherein R is hydrogen or $C_1$–$C_6$ alkyl, $R^1$ is a

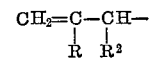

radical or a hydrocarbon radical—especially an alkyl radical (more especially $C_1$–$C_6$)—which is substituted by one or more (preferably two)

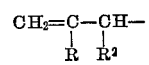

radicals, $R^2$ is hydrogen or alkyl (preferably $C_1$–$C_6$), $R^1$ and $R^2$ together with the CH— they enclose may be part of a 5- or 6-membered aliphatic ring system, e.g. cyclohexyl, cyclopentyl, which system in turn carries one or more

substituents.

For the purposes of this invention, the aliphatic or cycloaliphatic hydrocarbons with two or more allyl groups preferably contain up to 20 carbon atoms. Examples of such compounds include 1,5-hexadiene, 2-methyl-1,5-hexadiene, 2,5-dimethyl-1,5-hexadiene, 3,4-diethyl-1,5-hexadiene, 2 - methyl - 5 - isopropyl-1,5-hexadiene, 1,6-heptadiene, 1,8-nonadiene, n-1,4,9-decatriene and 1,2,4-trivinylcyclohexane.

Suitable further cross-linking agents which if desired may be used to produce the acrylonitrile copolymers of this invention include, for example, divinyl benzene, trivinyl benzene, divinyl toluene, divinyl xylene and divinyl naphthalene.

Other copolymerisable monomers may also be used together with acrylonitrile and the cross-linking agents for the production of the copolymers, examples of such monomers being aromatic monovinyl compounds such as styrene and substituted styrenes, vinyl esters, vinylidene chloride, esters of $\alpha,\beta$-olefinically unsaturated carboxylic acids such as acrylates and methacrylates, and conjugated diolefins such as butadiene, isoprene and chloroprene. The additional monomers are preferably used in quantities from 1 to 50% by weight, based on the total weight of the monomers. It is possible, by including these aditional monomers in the polymerisation mixture to mixture to vary the mechanical properties of the end products.

The copolymers prepared in the presence of hydrocarbons containing two or more allyl groups, contain hardly any uncross-linked, i.e. soluble components. This is all the more surprising insofar as it is known, for example, that no insoluble copolymers can be obtained by copolymerising methyl methacrylate, with 1,5-hexadiene [Proc. Roy. Soc. (London) Ser. A163 (1937)216].

The aforementioned monomers may be copolymerised by processes known per se in bulk, solution, suspension or emulsion. In one preferred embodiment, the monomers are copolymerised in aqueous suspension. Suitable polymerisation catalysts are the conventional compounds which form free radicals, such as organic and inorganic peroxides or catalysts containing azo groups, for example acetyl peroxide, benzoyl peroxide, lauroyl peroxide, cumene hydroperoxide and azodiisobutyronitrile. The effect of these catalysts can be intensified by means of heat and/or actinic rays. It is also possible to use so-called activators such as organic oxidisable oxygen-containing sulphur compounds or tertiary amines in addition to the catalysts mentioned. The copolymers are obtained in the form of microspheres or beads whose size can be regulated by the agitation speed, by the use of suspending agents, such as kaolin, polyvinyl alcohol or methyl cellulose, and by controlling the temperature.

In order to obtain copolymers of a wide-pore structure, polymerisation may be carried out in the manner described in German Auslegeschrift No. 1,113,570, i.e., in the presence of organic solvents, in which the monomers are soluble but the polymer is insoluble and nonswellable or is only slightly swellable. Organic nonsolvents and non-swelling agents of this kind for the polymers include, for example, aliphatic hydrocarbons, alcohols, ethers, nitro compounds and esters.

The degree of cross-linking of the polymers can be varied within wide limits. For example, monomer mixtures of 2 to 20% by weight, and preferably 5 to 15% by weight, of an aliphatic or cycloaliphatic hydrocarbon containing two or more allyl groups and 98 to 80% by weight, preferably 95 to 85% by weight, of acrylonitrile may be used to produce the acrylonitrile copolymers. In one particularly preferred embodiment of the process, divinyl benzene is used as an additional cross-linking agent together with acrylonitrile and the allyl compound of the aforementioned type. In this preferred embodiment, the monomer mixture to be polymerised contains, in addition to the acrylonitrile, 2 to 20% by weight, and preferably 3 to 8% by weight, of divinyl benzene and 2 to 12% by weight, preferably 2 to 5% by weight, of a hydrocarbon containing two or more allyl groups.

Polymerisation itself is carried out in the usual way. A suitable polymerisation technique is described, for example in British patent specifications Nos. 778,104, and 972,897.

It is possible, by using the aliphatic or cycloaliphatic hydrocarbons with two or more allyl groups as cross-linking agents, to obtain complete cross-linking of the polymers so that no uncross-linked components can be dissolved out of them. The cross-linking itself is resistant to hydrolysis. Accordingly the polymers may with advantage replace conventional acrylonitrile polymers for purposes where a resistance to hydrolysis and insolubility are two requirements which the polymers have to meet.

The copolymers prepared in accordance with the invention can be tested for the presence of uncross-linked, i.e., soluble, components by extraction with a suitable solvent followed by analysis of the substances dissolved in the solvent.

One particular field of application of the copolymers cross-linked in accordance with the invention is the production of weakly acidic ion exchangers. It has already been proposed to produce ion exchangers of this kind from copolymers of acrylonitrile with methacrylic anhydride, acrylic or methacrylic acid vinyl or allyl esters, acrylates or methacrylates of polyhydric alcohols, allyl esters of dibasic acids, N,N'-methylene-bis-acrylamide, vinyl, allyl or homologous ethers or divinyl benzene as cross-linking agents. Weakly acidic cation exchanger resins containing carboxyl groups can be obtained by the alkaline or acid hydrolysis of those copolymers.

As indicated above most of these copolymers are not resistant against hydrolysis and are gradually dissolved in a hydrolysis reaction with strong acids or bases. The ion exchangers obtained therefrom are unsatisfactory.

In copolymers for the production of weakly acidic ion exchange resins, the cross-linking molecules must be resistant to hydrolysis. The presence of uncross-linked or very weakly cross-linked polyacrylonitrile, which is formed when divinyl benzene is used as the cross-linking agent is also a serious disadvantage, because when the nitrile groups are hydrolysed with strong alkalis, for example, at elevated temperature, the uncross-linked or very weakly cross-linked polymer components are dissolved. The consequence of this is a fairly low yield of ion exchange resin. Incompletely cross-linked ion exchange resins cannot be used e.g., in the preparation of drinking water, as the uncross-linked components dissolve more or less readily in the water and only weakly cross-linked parts also are gradually dissolved.

It has been found that considerably improved weakly acidic ion exchangers can be obtained by using the above described copolymers of acrylonitrile and cross-linking agents containing two or more allyl groups and, optionally, other hydrolysis-resistant cross-linking agents for their production.

The nitrile groups present in the copolymers as described may be hydrolysed by known processes [cf. Houben-Weyl, Methoden der organischen Chemie, vol. XIV/2, pp. 708 et seq. (1963) which is included by reference]. The result of the process is in fact the production of carboxylic acid groups from the nitrile groups of the polymers.

The weakly acidic ion exchange resins are obtained in excellent yields. They are insoluble both in alkalis and acids and thus satisfy even the most stringent requirements. They are tested for the presence of uncross-linked components as described in connection with the copolymers themselves.

EXAMPLES 1–16

The results of extraction tests on copolymers of acrylonitrile and various polyunsaturated compounds are set out in Table 1.

To produce the copolymers, monomer mixtures of acrylonitrile, an aliphatic or cycloaliphatic hydrocarbon with two or more allyl groups and/or divinyl benzene (approx. 60% by weight commercial mixture, the remainder being ethyl styrene) containing 0.5% by weight of dibenzoyl peroxide and optionally in the presence of 10 to 20% by weight, based on the total quantity of monomers, of an inert hydrocarbon were suspended in 160% by weight of a 0.15% by weight aqueous methyl cellulose solution. The resulting suspensions were then heated with stirring for 5 hours at 65° C., 15 hours at 75–80° C. and 2 hours at 90° C. in a nitrogen atmosphere, and the beads thus formed were dried in vacuo at 100° C. to drive off the inert hydrocarbon.

Samples of the bead polymers thus obtained, dried until constant in weight, were thoroughly extracted with dimethyl formamide in an Soxhlet apparatus at 50 to 60 torr corresponding to 80–90° C., and the residue, after evaporation of the dimethyl formamide, was evaluated.

The results are set out in Table 1 below.

TABLE 1

| Example | Amount of allyl-group-containing hydrocarbon in the monomer mixture — Type | Percent by weight | Amount of divinyl benzene (100%) in the monomer mixture, percent by weight | Inert hydrocarbon Type | Percent by weight | Evaporation residue from dimethyl formamide in percent by weight of the copolymer |
|---|---|---|---|---|---|---|
| 1 | 2,5-dimethyl-1,5-hexadiene | 8 | | | | 0.4 |
| 2 | 1,5-hexadiene | 4 | | | | 1.4 |
| 3 | 1,2,4-trivinylcyclohexane | 8 | | | | 0.8 |
| 4 | n-1,4,9-decatriene | 8 | | | | 1.5 |
| 5 | 1,5-hexadiene | 2 | 6 | | | 0.8 |
| 6 | 1,2,4-trivinylcyclohexane | 3 | 5 | | | 0.7 |
| 7 | do | 1 | 7 | | | 1.8 |
| 8 | n-1,4,9-decatriene | 3 | 5 | | | 1.7 |
| 9 | 1,2,4-trivinylcyclohexane | 3 | 5 | White spirit | 10 | 1.3 |
| 10 | do | 3 | 5 | do | 20 | 1.0 |
| 11 | do | 3 | 5 | Hydrogenated triisobutylene | 10 | 1.1 |
| 12 | 2,5-dimethyl-1,5-hexadiene | 2 | 6 | do | 20 | 1.5 |
| 13 | | | 8 | | | 3.5 |
| 14 | | | 5 | | | 9.5 |
| 15 | | | 8 | Hydrogenated triisobutylene | 10 | 7.3 |
| 16 | | | 8 | White spirit | 20 | (¹) |

¹ Approximately 23.

EXAMPLES 17–26

The results of extraction tests on cation exchange resins obtained by the alkaline hydrolysis of copolymers of acrylonitrile and various polyunsaturated compounds, are set out in Table 2.

To produce the copolymers, monomer mixtures of acrylonitrile an aliphatic or cycloaliphatic hydrocarbon with 2 or more allyl groups and/or divinyl benzene (approximately 60% by weight commercial mixture, the rest being ethyl styrene) containing 0.5% by weight of dibenzoyl peroxide and optionally in the presence of 10 or 20% by weight, based on the total amount of monomers, of an inert hydrocarbon were suspended in 160% by weight of a 0.15% by weight aqueous methyl cellulose solution. The resulting suspensions were heated with stirring for 5 hours at 65° C., for 15 hours at 75 to 80° C. and for 2 hours at 90° C. in a nitrogen atmosphere, and the beads thus formed were dried in vacuo at 100° C. to drive off the inert hydrocarbon.

For hydrolysis, approximately 400 g. of the copolymers whose nominal content of divinyl benzene and aliphatic or cycloaliphatic hydrocarbons with several allyl groups is given in Table 2 below as a percentage of the monomer mixture, were heated for 10 hours at 150 to 155° C. in 1000 ml. of 45% by weight aqueous sodium hydroxide and 500 ml. of methanol. After the reaction liquid had been washed out in a filter tube, the cation exchanger was converted into the H-form with an excess of 3% by weight hydrochloric acid and then washed until neutral.

200 ml.-samples of the cation exchange resins thus produced were extracted with fully desalted water in a Soxhlet apparatus and the carboxylic acid content of the extracts was determined by alkalimetric titration. The results of these extraction tests are given in Table 2 below.

The advantageous use of the copolymers of acrylonitrile, aliphatic or cycloaliphatic hydrocarbons with 2 or more allyl groups and, optionally, another cross-linking agent, for the production of weekly acidic ion exchange resins is furthermore shown in Table 3 below. The yield of ion exchange in the H-form (dry weight), based on the polymer used, is given in Table 3 for some of the above examples. It comprises 93–95% of the theoretical (Examples 20–22 and 24) where the starting materials were copolymers incorporating an allyl-group-containing hydrocarbon as cross-linking component. By contrast, there are considerable losses of material when copolymers of acrylonitrile and divinyl benzene are subjected to alkaline hydrolysis (Examples 25 and 26).

TABLE 3

| Example | Copolymer used for hydrolysis, g. dry weight | Yield of cation exchanger in the H-form g. dry weight | Percent of the theoretical |
|---|---|---|---|
| 20 | 500 | 629 | 95 |
| 21 | 200 | 242 | 93 |
| 22 | 400 | 489 | 93 |
| 24 | 400 | 497 | 95 |
| 25 | 400 | 395 | 76 |
| 26 | 400 | 320 | 61 |

EXAMPLE 27

A mixture of 667 g. of acrylonitrile, 22.5 g. of 1,2,4-trivinylcyclohexane, 60.5 g. of divinyl benzene (61.9% by weight the remainder being ethyl styrene), 150 g. of white spirit, 5 g. of dibenzoyl peroxide (75% by weight) and 7.9 g. of dicumyl peroxide (95% by weight) was suspended in 1200 ml. of water containing 1.8 g. of methyl cellulose, and the resulting suspension was bead-

TABLE 2

| Example | Amount of allyl-group-containing hydrocarbon in the monomer mixture — Type | Percent by weight | Amount of divinyl benzene (100%) in the monomer mixture percent by weight | Inert hydrocarbon Type | Percent by weight | Time (hours) | Extraction of the cation exchanger resin with water Acid content in extract (mvals) |
|---|---|---|---|---|---|---|---|
| 17 | 2,5-dimethyl-1,5-hexadiene | 8 | | | | 20 | 1.4 |
| 18 | 1,2,4-trivinyl-cyclohexane | 8 | | | | 20 | 1.1 |
| 19 | do | 1 | 7 | | | 20 | 1.1 |
| 20 | do | 3 | 5 | | | 0 | 0.3 |
| 21 | 1,5-hexadiene | 2 | 6 | | | 20 | 0.2 |
| 22 | 1,2,4-trivinyl cyclohexane | 3 | 5 | Triisobutylene, hydrogenated | 10 | 20 | 0.5 |
| 23 | do | 3 | 5 | White spirit | 10 | 20 | 0.8 |
| 24 | do | 3 | 5 | do | 20 | 0 | 0.8 |
| 25 | | | 8 | | | 20 | 10.0 |
| 26 | | | 8 | White spirit | 20 | 20 | 15.2 | polymerised for 5 hours at 65° C., 15 hours at 75° C. and 2 hours at 90° C. in a nitrogen atmosphere.

400 g. of the dried bead polymer were hydrolysed and worked up as described in connection with Example 17 to 26. When a 200-ml. sample of the cation exchanger resin in the H-form was extracted as described above, the extract was found to have an acid content of 0.9 mvals.

We claim:
1. A copolymer of
   (A) acrylonitrile and
   (B) a monomer of the formula

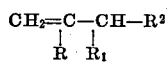

in a ratio of (A) to (B) of about 98–80:2–20 percent by weight, wherein
   R is hydrogen or alkyl of 1–6 carbon atoms;
   R' is defined as

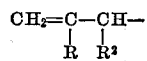

or alkyl of 1–6 carbon atoms having 1–2

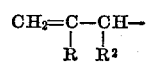

radicals attached thereto;
R² being defined therein as hydrogen or alkyl of 1–6 carbon atoms; or R' and R² together with the attached carbon atom may be a 5–6 membered aliphatic ring having 1–2

radicals attached thereto.

2. A cation exchanger obtained by hydrolyzing the nitrile groups of a matrix consisting of the copolymer of claim 1.

3. Copolymers according to claim 1 wherein a further monomer is copolymerized which is selected from the group consisting of styrene, ethyl styrene, vinylidene chloride, acrylic and methacrylic acid ester, and conjugated diolefine.

4. Copolymer of claim 1 wherein a further cross-linking agent selected from the group consisting of trivinyl benzene, divinyl naphthalene, divinyl benzene, and divinyl toluene is incorporated therein.

5. A cation exchanger obtained by hydrolyzing the nitrile groups of a matrix consisting of the copolymer of claim 3.

6. A cation exchanger obtained by hydrolyzing the nitrile groups of a matrix consisting of the copolymer of claim 4.

References Cited

UNITED STATES PATENTS

| | | | |
|---|---|---|---|
| 2,597,437 | 5/1952 | Bodamer | 260—83.5 |
| 2,678,407 | 5/1954 | Ferris et al. | 260—2.2 |
| 2,885,371 | 5/1959 | Tavani et al. | 260—2.2 |
| 2,891,015 | 6/1959 | Tsunoda et al. | 260—2.2 |
| 3,278,503 | 10/1966 | Serniuk et al. | 260—82.5 |

FOREIGN PATENTS 932,125  7/1963  Great Britain.

HAROLD D. ANDERSON, Primary Examiner

M. GOLDSTEIN, Assistant Examiner

U.S. Cl. X.R.

260—80.7, 80.78, 80.81, 85.5